United States Patent [19]
Snyder

[11] 3,815,941
[45] June 11, 1974

[54] YIELDABLE CONNECTOR FOR EXHAUST PIPE SECTIONS

[76] Inventor: Kenneth F. Snyder, 2844 E. Pleasant, Eden, N.Y. 14057

[22] Filed: June 5, 1972

[21] Appl. No.: 259,428

[52] U.S. Cl. .............................. 285/283, 285/403
[51] Int. Cl. ............................................. F16l 27/00
[58] Field of Search ....... 285/283, 429, 114, 334 A, 285/403; 16/18 L; 24/277, 81 A, 125 M, 135 M; 141/387; 248/230

[56] References Cited
UNITED STATES PATENTS

| | | | |
|---|---|---|---|
| 2,814,507 | 11/1967 | Lattimore | 285/114 X |
| 3,063,741 | 11/1962 | Bockerman | 285/283 |
| 3,151,372 | 10/1964 | Miles | 33/86 X |
| 3,345,092 | 10/1967 | Athmon et al. | 285/283 |
| 3,352,573 | 11/1967 | Canning | 285/283 X |

Primary Examiner—Dave W. Arola
Attorney, Agent, or Firm—Raymond F. Kramer

[57] ABSTRACT

A yieldable two-section connector for vertical sections of motor truck engine exhaust piping includes a pair of matching flanges which are adapted to be joined to separate exhaust pipe sections, a hinge joined to the flanges, and offset springs connecting one such flange of one connector section to clamp means held in desired position on the other section, to hold the connector sections and the pipe firmly in place with the flange surfaces in contact.

10 Claims, 6 Drawing Figures

PATENTED JUN 11 1974 3,815,941

YIELDABLE CONNECTOR FOR EXHAUST PIPE SECTIONS

This invention relates to yieldable exhaust pipe sections. More particularly, it relates to exhaust piping, such as vertical motor vehicle engine exhaust pipes, which can be extended upwardly or lowered so as to avoid striking overhead obstructions, such as wires, conveyors, low bridges, overpasses, tree branches and garage, warehouse and factory doorframes.

Most trucks and tractors such as those of tractor-trailer combinations are diesel powered and include vertical exhaust pipes which extend upwardly high enough so that the exhaust is normally discharged above or at about the top of the truck or trailer and in front of the truck body or trailer. With such discharge heights the exhaust fumes pass over the trailer whereas, if the exhaust pipe terminates short of the trailer top the exhaust will be carried along the sides of the trailer. In the former case any discoloration caused by carbon particles or other products of combustion in the exhaust will discolor only the trailer roof whereas in the latter case the sides of the trailer will be marred.

Although roof discoloration is largely unobjectionable, the blackening of the sides of the trailer adversely affects its appearance, requires frequent washings and ultimately may necessitate repainting. Accordingly, the exhaust pipes are normally made so that they extend upwardly as high as feasible and so that the discharge of exhaust smoke is above the top of the truck body or trailer. While it is generally desirable for the exhaust to be discharged as high as feasible, there are occasions when such a high exhaust pipe can be a hindrance to the operation of a vehicle. When passing low bridges sometimes an extended exhaust pipe may strike the under portion of the bridge, causing the pipe to be broken off. The exhaust outlet may be sealed by such a contact, causing rupturing of the muffler or harming some engine parts. It is self-evident that extensive damage can be caused by the extended exhaust pipe striking electric and telephone wires, overhead conveyors or walkways and hanging signs over roads. Tree branches can cause bending or breaking of the exhaust pipe and it may also be damaged by contact with the overhead portions of doorframes of garages, warehouses, barns, repair facilities and factories. Thus, it has been recognized as desirable for diesel exhausts to be as high as feasible during normal operating conditions but capable of being shortened easily and quickly when overhead obstructions are present or are likely to be encountered.

Mechanisms for adjusting the exhaust pipe height should be of such a structure that in normal operating position excessive vibration is not encountered, even at high speeds. It is also desirable that if the exhaust pipe should hit an obstruction it will yield, rather than break or be damaged. The present invention provides means for making a yieldable exhaust pipe, utilizing a yieldable connector for exhaust pipe sections. It is economical to manufacture, easy to install and simple to change the exhaust pipe from extended or connected to shortened or disconnected position and to do so quickly. Such pipes, made according to this invention and/or connected by the present connectors, have been tested in actual tractor-trailer runs and have been found to be free of vibration, yieldable to obstructions and easy to change from one condition to the other.

In accordance with the present invention a yieldable connector for sections of exhaust piping comprises first and second connector sections held together by a hinge, said first section comprising a tubular portion adapted to be fastened at one end to a first section of an exhaust pipe and having a flange at the other end thereof, said flange having joined to it said hinge and means opposite said hinge for fastening a spring or plurality of springs to it, the second connector section being adapted to be fastened to a second exhaust pipe section, the second connector section having an end which enters the first connector section when the connector is in connected position, a flange near said end adapted to contact the flange of the first connector section when the connector is in connected position, the flange having the hinge held to it so that the hinge and spring(s) cooperate to hold the sections of the connector and of the exhaust pipe firmly together in normal connected position and, upon rotation of the first section of the connector and the exhaust pipe about 180° about the hinge, to open position, hold the sections of the connector and the exhaust pipe firmly together in substantially side-by-side relationship. The invention is also of a yieldable exhaust pipe including the described connector and of means for fastening onto such an exhaust pipe section the spring(s) which hold the connector flange to the exhaust pipe.

The invention will be readily understood by reference to the following description, taken in conjunction with the drawing in which.

Figure 1:
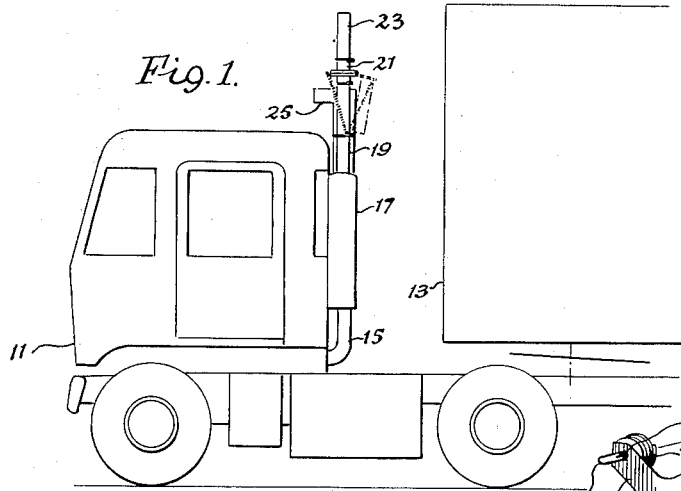
FIG. 1 is a side elevation of a tractor-trailer with a yieldable exhaust pipe illustrated thereon in both extended and (in phantom) withdrawn or shortened positions.

Numeral 11 designates the truck portion of a tractor-trailer combination, in which the trailer portion is represented by numeral 13. Exhaust pipe 15, located at the left side of the truck at the rear of the cab, carries the vehicle engine exhaust through muffler 17, exhaust pipe section 19, yieldable connector 21 and final exhaust pipe section 23, to a location where it is discharged into an "air stream" through which the tractor-trailer is passing. The terminal portion of the exhaust pipe and the part of the connector attached to it are shown in lowered position by phantom lines. As illustrated, air cleaner inlet 25 is located below the lowermost position of the exhaust outlet to prevent exhausted products of combustion from being drawn into the engine.

Figure 2:
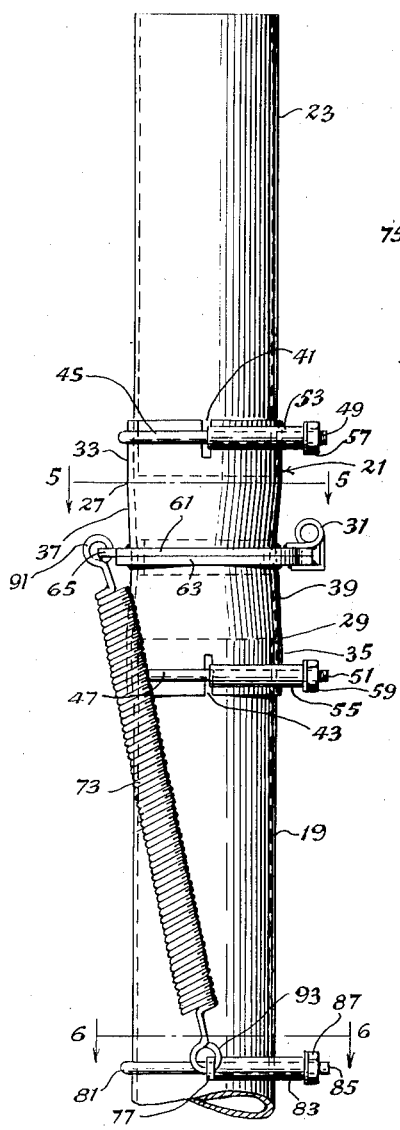
FIG. 2 is a side elevation of a portion of a yieldable exhaust pipe of this invention.

In FIG. 2 are shown first and second connector sections 27 and 29 held together by hinge 31. It will be noted that the connector sections comprise tubular portions 33 and 35 adapted to be fastened to pipe sections 23 and 19, respectively. They also include tapered wall portions 37 and 38, the internal walls of which act as stops for the exhaust pipe sections, preventing them from entering too far into the connector and protruding beyond the flanges thereof. The tubular ends of the connectors, illustrated herein as cylindrical ends, are slit, slotted or opened at 41 and 43 to facilitate entrances of pipes thereinto. Other means for aiding such entrances and for stopping the pipes at a desired location in the connector, e.g., flared sections, ledges, may also be employed. To hold the connector tightly to the pipe sections clamps 45 and 47 are used, each of which comprises respectively, threaded U-bolts 49 and 51, clamp portions 53 and 55 and nuts 57 for tightening the clamp portions against connector walls 33 and 35.

Hinge 31 is fastened to flange 61 which is held to the end of tapered connector portion 37. Such fastenings are usually by welding but other means of strongly holding the various structural parts of this invention together are also usable and in some cases the various parts may be molded, forged, stamped or otherwise fabricated as unitary pieces. Hinge 31 is also held to flange 63 which is fastened to tapered wall 39 of the second connector section 29. At the side opposite to the hinge flange 61 has a pair of extensions 65 and 67 thereon, each of which contains perforations, 69 and 71, respectively, through which the ends of springs 73 and 75 may be passed, after being sprung open, or may be crimped to hold the springs firmly in place. At the other ends of such springs similar circular ends are held to eyes in extensions 77 and 79, which extensions are held to means 81 for holding the bottoms of springs 73 and 75 in desired position and at desired tension. Means 81 comprises clamping means 83, threaded U-bolt 85 and nuts 87 and 89. Numerals 91, 93, 95 and 97 identify loops at the ends of the springs 73 and 75.

Figure 3:
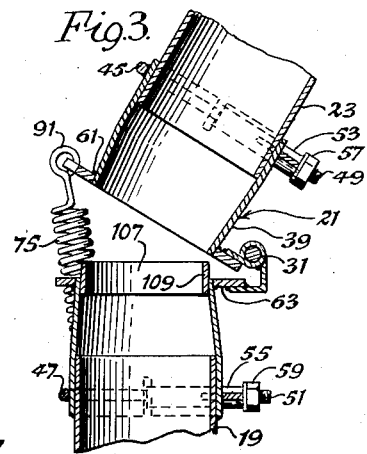
FIG. 3 is a central vertical section of a portion of the exhaust pipe and connector in tilted position.
Figure 5:
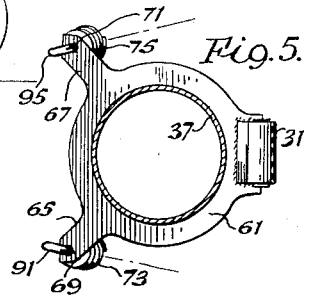
FIG. 5 is a sectional plan view along plane 5—5 of FIG. 2.
Figure 6:
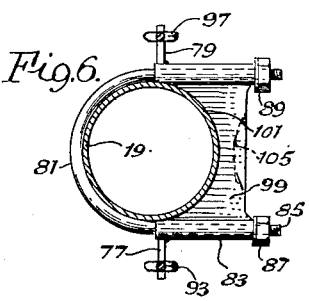
FIG. 6 is a sectional plan view along plane 6—6 of FIG. 2.
Figure 4:
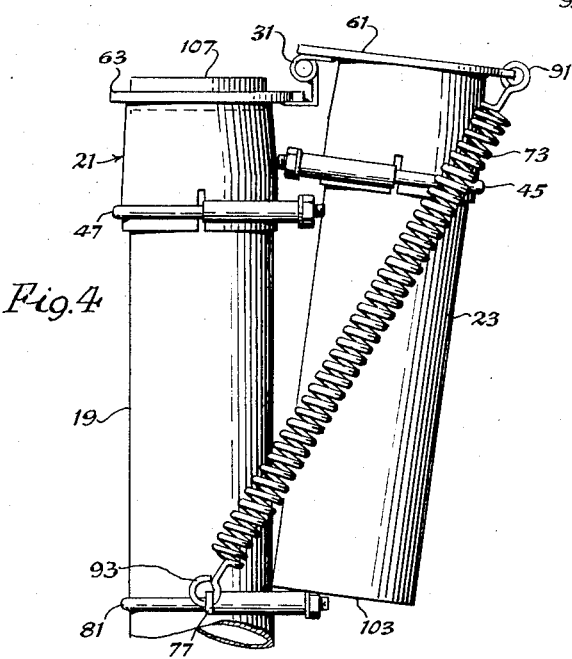
FIG. 4 is a side elevational view corresponding to that of FIG. 2, with the exhaust pipe being shown in shortened or disconnected position.

In FIGS. 3 and 4 is shown the detail of the flange portions of the connector which fit tightly together when the connector and the exhaust piping are in connected or closed position. It will be noted that springs 73 and 75 hold flanges 61 and 63 together tightly and the tight fit is aided by the fact that hinge 31 holds the connector tight on one side. Springs 73 and 75 fastened to extensions 65 and 67, hold the opposite side of the flange tightly down at two points substantially equidistant from each other and from the hinge. Lines drawn from holes 69 and 71 through the center of the tubular connector will usually be from 110° to 150° from a line through such center and the midpoint of the hinge. Also, it will be noted that openings 69 and 71 in extensions 65 and 67 are far enough away from the walls of the connector and the pipes to allow springs 73 and 75 to clear the pipes, connectors, clamps, etc., without contacting them, in all positions of the connectors and pipes, connected, disconnected and intermediate. Some contact may be tolerated but it is preferably avoided. This is also true with respect to the joinder of the springs to the spring holding means 81, as is shown in FIG. 6.

It will be noted that clamp means 83 has a flat section 99 curved at 101 to match the shape of the pipe and to press against it when nuts 87 and 89 are tightened. The other clamps illustrated are of similar constructions. As shown in FIG. 4, when the connectors and the exhaust pipes are in disconnected or open position with the pipes and connectors being substantially side-by-side, the top 103 of exhaust pipe section 23 clears the spring holding means 81 and the pipe side rests against the side wall of exhaust pipe section 19. If the spring holding means 81 is relocated upwardly or exhaust pipe section 23 is lengthened, the wall thereof may contact the holding means 81 at flat section 99. In such case, if desired, as indicated at 105 by phantom lines in FIG. 6, section 99 may be curved to conform to the shape of pipe section 23 or other means may be provided for cushioning, fitting or otherwise contacting pipe 23.

It is important that the exhaust gases flow through the exhaust pipe sections and the intervening connector and not leak out between flanges 61 and 63. To prevent leakage the flanges are held tightly together and as an additional protection there is provided an internal cylindrical section 107 having a short cylindrical wall 109 held to the interior of the bottom connector section and constituting an end thereof, with flange 63 being at or near such end. Wall 109 extends into the lower section of the connector 27 when the connector is in closed position and thereby forces exhaust gas past the flanges and helps to prevent leakage.

To install the described connector and convert a rigid exhaust pipe to a yieldable one is the work of only minutes. It is merely necessary to cut the pipe transversely at the desired position and connect the cut ends to opposite ends of the connector, after which springs 73 and 75 are connected to projections 77 and 79 by means of rings 93 and 97. The position of holding means 81 is regulated to obtain the desired tension of springs 73 and 75. In some cases it is unnecessary to utilize holding means 45 and 47 since the press fit of the pipes into the ends of the connector is sufficient to hold the pipes firmly in place. However, usually it will be desirable to utilize clamping means to make certain that the pipes are not worked loose.

To place the yieldable exhaust pipe in open or disconnected position it is not necessary to remove the springs. All that is needed is for the upper pipe section to be pressed backwardly so as to turn the pipe about hinge 31. Even if the pipe should hit a solid enough obstruction during movement of the truck, the upper pipe and connector section will be rotated about the hinge to the open position. Normally the exhaust pipes are of such heavy material, e.g., steel pipe 4 inches in diameter and 0.060 inch thick, that the shocks of contact make little impressions on them and therefore, it is not usually necessary to have particular cushioning or nesting means for the pipes to rest against in the open position. If desired, the connector may be rotated horizontally 180° so that the pipe will move yieldably forward, rather than backwardly but this is rarely necessary. Of course, when so relocated, the springs should be moved accordingly.

Instead of utilizing the exact constructions illustrated, various modifications or reversals of position may be effected without departing from the invention. Thus, the sealing portion 107 may be in the first connector section or may be replaced by an equivalent seal in which a portion of one connector section extends into the other. Springs 73 and 75 and flanges 61 and 63 may be changed in position and holding means 81 may be fastened to pipe section 23, so that equivalent movements of the pipes sections and the connector are obtained. More springs and holders can be employed but are not usually advantageous. Hinge design may be modified, as may be that of the clamps.

In addition to the various advantages in yieldability of the exhaust pipe already referred to, the simplicity of the structure, economy of manufacture and ease of installation, the present invention is also superior to other structures for the manufacture of yieldable exhaust pipe in its adaptability for use under different conditions. For example, the spring tension which holds the connector sections together may be adjusted so as to allow either ready or difficult rotation of the upper exhaust pipe section about hinge 31. All that is necessary to make such adjustment is to move the holding means 81 up or down and reset it in position. Of course, if desired, different springs may be easily installed. If a different length of exhaust pipe is wanted it is a simple matter to remove section 23 and replace it. In the disconnect or open position the springs, by toggle action, tightly hold the upper exhaust pipe section against the lower one, preventing vibration, rattling, wear and exhaust leaks. In the closed position cylindrical section 107 extends into connector 27 to prevent relative lateral movements of the connector portions and flanges 61 and 63, extending beyond the walls of the connector sections and held tightly together by the springs and the hinge, prevent longitudinal movement and rocking of the connector and the exhaust pipe section.

Most of the parts of the present apparatus are easily made from readily available materials, e.g., cold rolled or galvanized steel of 0.060 inch to 0.200 inch thickness and standard rods and nuts, about ¼ inch to ½ inch in diameter. If desired, alloy steels, e.g., stainless steel, can also be employed. Many of the parts used in the making of the present structure are standard and require only minor modifications, fabrications or weldings to convert them to finished connector form. Yet, despite the ready availability of the structural materials and parts, the relatively low prices thereof and the ease of installation, the structure made is vibration- and wear-resistant and has been proved exceedingly satisfactory in tests.

The invention has been described with respect to illustrations of preferred embodiments thereof but is not to be limited to these since it will be evident to one of skill in the art that substitutions may be made and equivalents may be employed without departing from the spirit of the invention or exceeding its scope.

What is claimed is:

1. A yieldable connector for sections of exhaust piping which comprises first and second connector sections adapted to be fastened to first and second exhaust pipe sections, respectively, and being held together by a hinge, said first section comprising a tubular portion adapted to be fastened at one end to a first section of an exhaust pipe and having a transversely extending flange at the other end thereof, means holding said flange to said hinge, said flange including means opposite said hinge for fastening at least one spring substantially directly to it, said flange and means opposite said hinge lying substantially in the same plane, the second connector section being adapted to be fastened to the second exhaust pipe section and having an end which communicates with the first connector section when the connector sections are in connected position, a transversely extending flange at said end which contacts the flange of the first connector section when the connector sections are in connected position, the flange having the hinge held to it so that the hinge, spring, fastening means and the flanges cooperate to hold the sections of the connector and of the exhaust pipe firmly together in normal connected position and, upon rotation of the first section of the connector and the exhaust pipe about 180° about the hinge, to open position, the hinge, spring, fastening means and flanges hold the sections of the connector and the exhaust pipe firmly together in substantially side-by-side relationship.

2. A yieldable connector according to claim 1 which is for sections of vertical, cylindrical, motor vehicle engine exhaust piping and in which the means opposite the hinge is for fastening a pair of springs to the flange and includes a pair of flange extensions positioned so that springs connected to them will clear the connector and piping section in connected, disconnected and intermediate positions.

3. A connector according to claim 2 wherein the transversely extending flanges are substantially flat and in normal connected position are holdable against each other by the springs, with the hinge, so as to prevent relative longitudinal movement and rocking of the connector and exhaust pipe sections.

4. A yieldable connector according to claim 2 wherein the end of the second connector section of the yieldable connector enters the first connector section when the connector sections are in connected position.

5. A yieldable connector according to claim 2 wherein the pair of flange extensions for fastening of the springs is so located that lines communicating their axes with the center of the cylindrical connector make obtuse angles with a line communicating such connector center with the mid-point of the hinge.

6. A yieldable connector according to claim 5 wherein the end of the second connector section of the yieldable connector enters the first connector section when the connector sections are in connected position.

7. A yieldable connector according to claim 2 wherein a pair of tension springs is attached to the extensions of the flange on the end of the first connector section.

8. A yieldable connector according to claim 5 wherein a pair of tension springs is attached to the pair of flange extensions of the first connector section through holes in such extensions and the springs are adapted to be fastened to the second exhaust pipe section.

9. A yieldable cylindrical exhaust pipe for a motor vehicle engine which comprises first and second exhaust pipe sections, first and second yieldable connector sections adapted to be fastened to the first and second exhaust pipe sections respectively and being held together by a hinge, said first connector section comprising a cylindrical portion adapted to be fastened at one end to the first section of exhaust piping and having a transversely extending flange at the other end thereof, means holding said flange to said hinge, said flange including a pair of flange extensions opposite said hinge for fastening a pair of springs substantially directly to it, said flange extensions and said flange lying substantially in the same plane, a pair of tension springs fastened substantially directly to such flange extensions and being adapted to be fastened to the second exhaust pipe section, the second yieldable connector section having an end which enters the first connector section when the connector sections are in connected position, a transversely extending flange at said end which contacts the flange of the first connector section when the connector sections are in connected position and means for fastening the tension springs onto the second section of exhaust pipe and for holding them in desired position so that the hinge, springs, fastening means and the flanges cooperate to hold the sections of the connector and of the exhaust pipe firmly together in normal connected position and, upon rotation of the first section of the connector and the exhaust pipe attached thereto about 180° about the hinge, to open, yielded position, the hinge, springs, flanges and fastening means hold the sections of the connector and the exhaust pipe firmly together in substantially side-by-side relationship.

10. A yieldable exhaust pipe for a motor vehicle engine which comprises upper and lower exhaust pipe sections, a yieldable connector connecting such sections and including upper and lower connector sections, a pair of springs joined to one of such connector sections and adjustably fastened to the opposed exhaust pipe section and clamp means tightly clamping about the circumference of the exhaust pipe, having joined to it and extending away from the exhaust pipe a pair of means fastening onto the ends of such springs, such springs being located far enough away from the exhaust piping and connector parts so that the springs are not obstructed by such or other portions of the fastening means and clamping means when the exhaust pipe is in normal and yielded positions and when it is between such positions.

* * * * *